April 23, 1957   T. C. DINGMAN ET AL   2,789,622
ADJUSTABLE VEHICLE SEAT

Filed Nov. 20, 1953   2 Sheets-Sheet 1

T. C. DINGMAN
E. F. COOK
INVENTORS

BY
ATTORNEYS

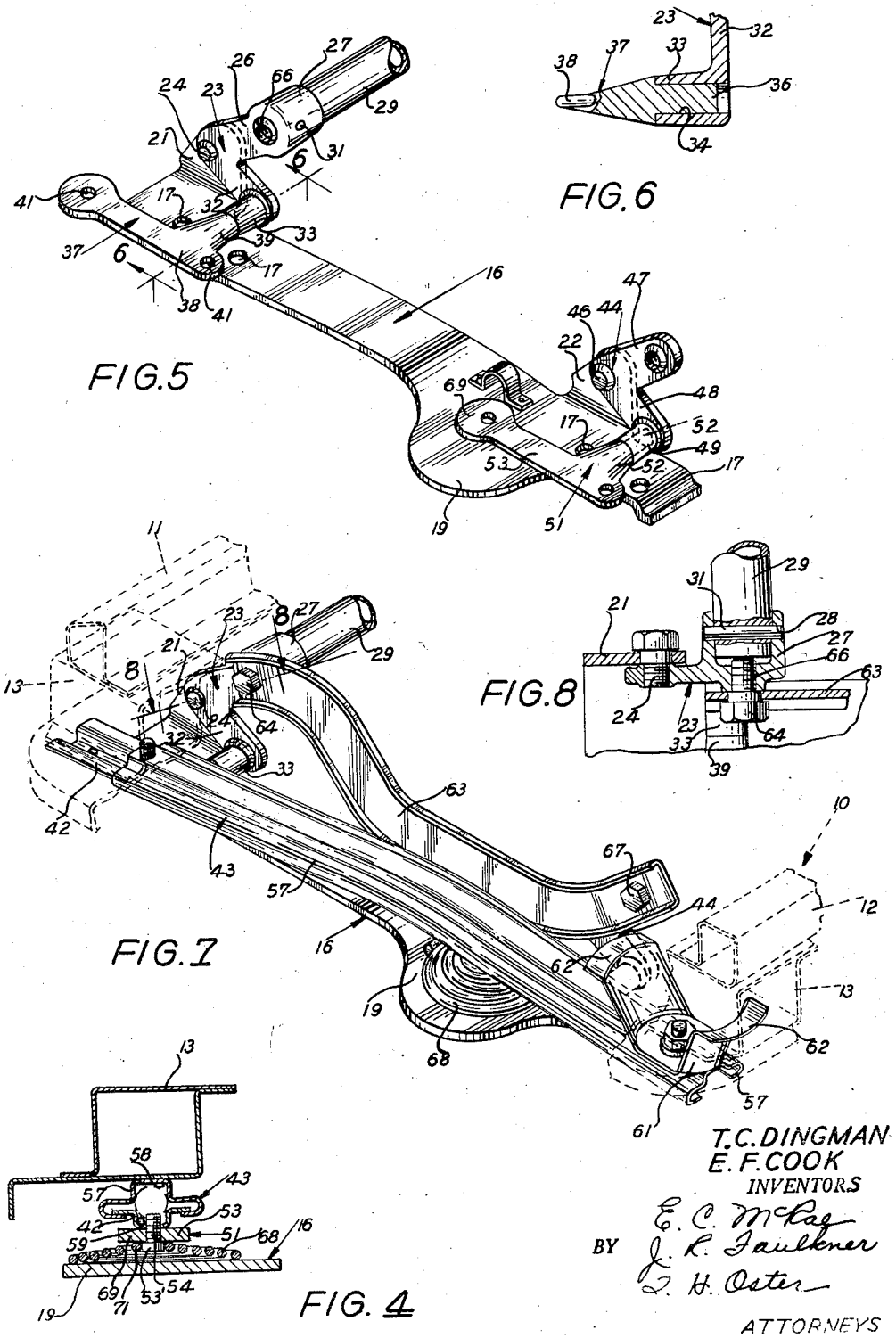

2,789,622

Patented Apr. 23, 1957

United States Patent Office

2,789,622

ADJUSTABLE VEHICLE SEAT

Thomas C. Dingman, Dearborn, and Ernest F. Cook, Detroit, Mich., assignors to Ford Motor Company, Dearborn, Mich., a corporation of Delaware Application November 20, 1953, Serial No. 393,258

4 Claims. (Cl. 155—14)

This invention relates generally to adjustable seats for motor vehicles, and has particular reference to vehicle seats adapted to be adjusted vertically as well as horizontally.

It has been customary to provide motor vehicles with front seats capable of being adjusted forwardly and backwardly in a direction longitudinally of the vehicle to adjust the driver's position with respect to the vehicle controls. More recently the "four-way" seat has found increased popularity. In this construction the vehicle seat is adjustable upward and downward in a vertical direction as well as forward and backward in a horizontal direction so as to provide a more complete adjustment for the driver's position relative to the vehicle controls and windshield. In one form of four-way seat construction a first frame is mounted upon the vehicle floor for fore and aft adjustment, utilizing for this purpose conventional seat track units. A second frame is then mounted for vertical adjustment upon the upper seat tracks and carries the vehicle seat itself. In the construction of the present invention, however, but a single frame is employed, being conventionally attached to the upper seat tracks of a pair of longitudinally adjustable track units, with the track units being bodily moveable in a vertical direction to effect the desired upward and downward adjustment of the seat. This construction is economical to manufacture and simple in construction and utilizes many of the components of the conventional two-way or longitudinally adjustable seat mechanism. In addition, it is readily adaptable to either mechanical or power operation, and is trouble free in use.

Another object of the invention is to provide a four-way adjustable vehicle seat inherently of such sturdy and rigid construction as to eliminate the need for a torque bar or other means between the opposite sides of the seat to insure simultaneous longitudinal adjustment of each side of the seat. The invention also incorporates a balanced construction for effecting vertical adjustment to insure simultaneous up and down movement at each side of the vehicle seat, and in addition provides counterbalancing means for assisting the upward movement of the seat.

Other objects and advantages of this invention will be made more apparent as this description proceeds, particularly when considered in connection with the accompanying drawings, wherein:

Figure 4 is an enlarged cross-sectional view taken on the line 4—4 of Figure 1.

Figure 5 is an enlarged perspective view of a subassembly illustrating a portion of the mechanism for effecting vertical adjustment of the seat.

Figure 6 is a cross-sectional view taken on the line 6—6 of Figure 5.

Figure 7 is an enlarged perspective view of a portion of the construction, similar to Figure 5 but showing the addition of several parts thereto.

Figure 8 is a cross-sectional view taken on the line 8—8 of Figure 7.

Figure 1:
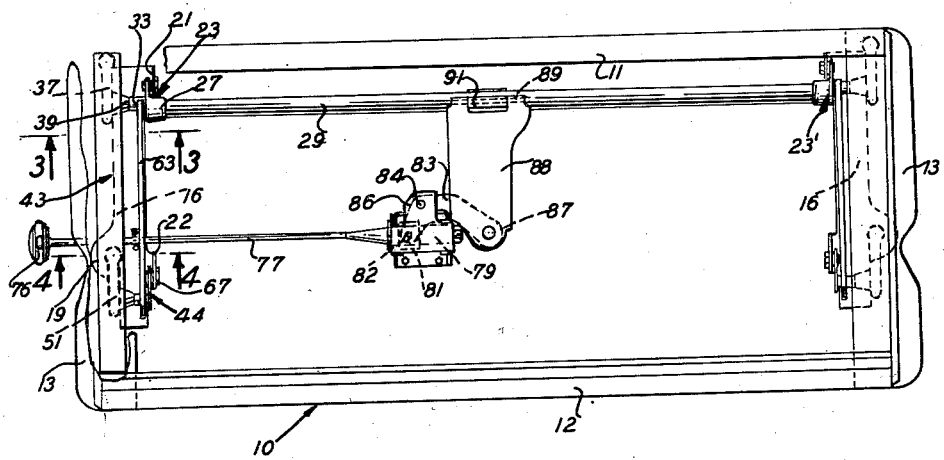
Figure 1 is a plan view of a four-way adjustable seat mechanism incorporating the present invention.
Figure 2:
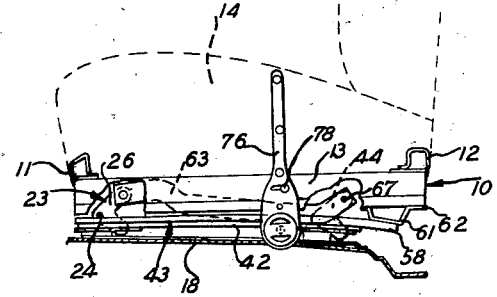
Figure 2 is an end elevation, partly broken away, of the construction shown in Figure 1.
Figure 3:
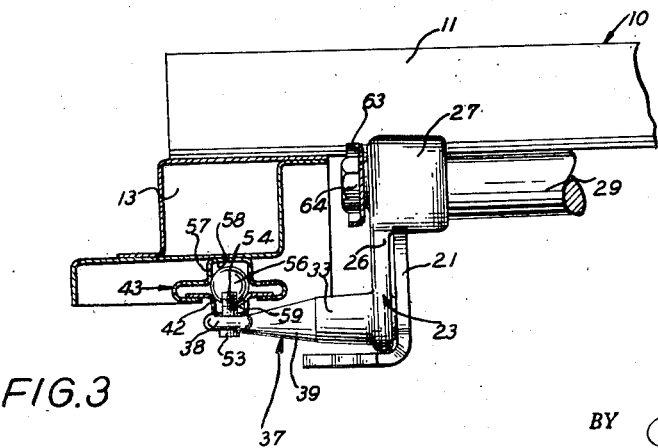
Figure 3 is an enlarged cross-sectional view taken on the line 3—3 of Figure 1.

Referring now to the drawings, and particularly to Figure 1, the seat frame 10 is formed of front and rear rails 11 and 12 respectively, and side rails 13. As seen in Figure 2, the front and rear rails 11 and 12 are of box section and are seated upon the end rails 13, being suitably secured thereto as by welding. As shown in Figures 3 and 4, the side rails 13 are also of box section. The seat frame supports a conventional vehicle front seat 14 shown in phantom in Figure 2.

The seat frame 10 is mounted for up and down movement, as well as fore and aft movement, to achieve four-way adjustability. The construction at each side of the frame is the same, and accordingly only the construction at the left side of the seat will be described in detail.

With reference now particularly to Figure 5, the reference character 16 indicates a stamped floor bracket provided with mounting holes 17 adjacent each end thereof for attachment to the floor panel 18 of the vehicle body (Figure 2). The base of the floor bracket 16 is formed with an enlarged semicircular flange 19 projecting laterally outwardly therefrom for a purpose to be described more in detail hereinafter. Adjacent the laterally inner edge of the floor bracket 16, the latter is formed with integral upwardly projecting mounting flanges 21 and 22 adjacent the forward and rearward portion respectively of the seat.

A bell crank lever 23 is pivotally supported upon the mounting flange 21 by means of a pivot pin 24. The bell crank lever 23 is formed with an upper arm 26 having an enlarged laterally inwardly projecting boss 27 provided with a bore 28 for receiving the end of an actuating shaft 29 extending in a lateral direction completely across the vehicle seat and having its opposite end connected to a similar bell crank lever 23' at that side.

A pin 31 extends through the boss 27 at the end of the bell crank lever arm 26 and the hollow shaft 28 to secure the two together. The bell crank lever 23 is also formed with an integral lower arm 32 formed at its end with a laterally outwardly extending boss 33. The boss 33 is formed with a bore 34 extending therethrough for rotatably receiving the cylindrical shank 36 of the track support arm 37. The track support arm 37 has an elongated flange 38 integrally connected to the shank 36 thereof by means of a tapered connecting portion 39. Openings 41 are provided at opposite ends of the flange 38 of the track support arm for connection to the lower track 42 of the longitudinally adjustable track unit 43.

A second or rearward bell crank lever 44 is pivotally connected by means of a pin 46 to the rearward mounting flange 22 of the floor bracket 16, and is provided with upper and lower arms 47 and 48 respectively. The lower arm 48 is formed with a laterally outwardly projecting boss 49 similar in construction to the boss 33 of the front bell crank lever 23. A rear lower arm 32 of the front bell crank lever 23. A rear track support arm 51, identical in construction to the front track support arm 37, is integrally formed with a cylindrical shank 52 rotatably received within a bore formed in the boss 49 of the lower arm 48 of the rear bell crank lever 44. The flat horizontal flange 53 of the rear track support arm 51 is adapted to be connected to the rearward end of the lower track 42 of the longitudinally adjustable track unit 43.

As seen in Figure 3, each end of the flat flange 38 of the front track support arm 37, as well as each end of the flat flange 53 of the rear track support arm 51, is connected to the lower track 42 by means of a stud 53', the upper end 54 of which projects into the track unit 43 and form a stop limiting the movement of the spherical ball 56 serving as the antifriction means between the upper track 57 and the lower track 42.

It will be noted that the upper and lower tracks telescopically embrace each other and are provided with channel-shaped raceways 58 and 59. The width of each channel-shaped raceway 58 and 59 is slightly less than the diameter of the antifriction balls 56 so that the balls 56 ride, not upon the bottom of the raceways, but upon the inner corners thereof, as seen in Figures 3 and 4. This forms a track construction having a minimum of lost motion and contributes toward a rigid seat construction in which simultaneous longitudinal adjustment of each side of the seat can be effected without the necessity of providing the usual torque bar or other interconnecting means.

The upper track 58 of the longitudinally adjustable track unit 43 supports the seat frame 10. At its forward end the upper seat track 58 is bolted directly to the lower flange of the box section side frame rail 13. At the rearward end of the upper track 58 the latter is bolted to a U-shaped supporting bracket 61 having outwardly turned upper flanges 62 welded to the bottom flange of the side frame rail 13.

It will thus be seen that the longitudinally adjustable track units 43 at each side of the seat and the seat frame 10 are supported upon the track support arms 37 and 51 for bodily vertical movement. To coordinate the vertical adjustment of the forward and rearward portions of the seat, the front and rear bell crank levers 23 and 44 respectively are interconnected by means of a connecting link 63.

The link 63 is channel-shaped in cross-section for strength, and is pivotally connected at its forward end to the upper arm 26 of the front bell crank lever 23 by means of a stud 64 threaded into a tapped hole 66 provided in the laterally outer end of the boss 27 formed at the end of the arm 26 of the bell crank lever. At its rearward end the link 63 is pivotally connected to the upper arm 47 of the rear bell crank lever 44 by means of a pivot stud 67.

It will be seen that angular movement of the front bell crank lever 23 about its pivot pin 24 effects a corresponding angular movement of the rear bell crank lever 44 about its pivot pin 46. Since the track support arms 37 and 51 secured to the lower track 42 are carried by the lower arms 32 and 48 of the front and rear bell crank levers 23 and 44 respectively, it will be seen that the simultaneous angular movement of the bell crank levers results in vertical movement of the seat track unit 44 and the seat frame carried thereby. By properly proportioning the length of the arms of the front and rear bell crank levers it is of course possible to vary in any desired manner the relative vertical movements of the front and rear portions of the vehicle seat.

Means are provided for counterbalancing the weight of the seat and to assist in effecting vertical adjustment in an upward direction. As best seen in Figure 4, a coil spring 68 is seated upon the enlarged laterally outwardly projecting flange 19 of the floor bracket 16. The small upper end 71 of the spring 68 is retained in position beneath the enlarged forward end 69 of the flange 53 of the rear track support arm 51 by the head of the stud 53 securing the lower track 42 to the track support arm 53. Inasmuch as the adjacent convolutions of the spring are made progressively larger in diameter it will be apparent that the spring can collapse into a relatively small space during the downward vertical adjustment of the seat. With a similar spring being provided at each side of the seat, the seat and the passengers are partially counterbalanced tending to equalize the effort required in raising and lowering the seat.

The fore and aft adjustment of the seat is effected by moving the upper track 58 and the seat frame 10 carried thereby longitudinally in the desired direction. The antifriction balls 56 facilitate this movement and conventional latching mechanism (not shown) is provided to hold the seat in the desired adjusted position.

Inasmuch as the longitudinally adjustable seat track units 43 at opposite sides of the seat frame are supported upon identical track support arms and bell crank levers, and since the front bell crank levers 23 are interconnected by a common laterally extending actuating shaft 29, it is only necessary to rotate the shaft 29 to adjust the seat upwardly or downwardly as desired. Either power means or manually operable means can be provided to rotate the actuating shaft 29 and effect vertical adjustment of the seat, and the construction lends itself readily to a simple power actuating installation. For the purpose of illustration, however, there is shown in this application a manually operable mechanical actuator, for vertically adjusting the seat. This actuator is shown more in detail in the copending application of J. W. Jamieson and T. C. Dingman, Serial No. 393,259, for Adjustable Vehicle Seat, and reference is made to that application for a more complete description of the mechanism.

Described briefly, the actuating mechanism for vertical adjustment of the seat comprises a handle assembly 76, Figures 1 and 2, having a ratchet connection to a cross shaft 77. A manually shiftable button 78 may be moved between two positions to permit rotation of the shaft 77 in either direction depending upon whether it is desired to raise or lower the seat. As seen in Figure 1, the inner end of the cross shaft 77 is formed with a screw threaded inner end 79 engageable with a nut 81 to effect axial movement of the nut upon rotation of the shaft. The nut is pivotally connected to the inner end 82 of an actuating arm 83. The arm 83 is pivotally mounted at 84 to the case 86 housing the inner end of the cross shaft 77. The opposite end of the actuating arm 83 is pivotally connected at 87 to a hinge bracket 88 which in turn is pivotally connected by means of a hinge pin 89 to a small hinge bracket 91 projecting upwardly from the actuating shaft 29 and welded thereto.

From the foregoing it will be seen that operation of the handle 76 effects rotation to the actuating shaft 29 in one direction or the other, as desired, and through the mechanism previously described raises or lowers the vehicle seat.

It will be understood that the invention is not to be limited to the exact construction shown and described, but that various changes and modifications may be made without departing from the spirit and scope of the invention, as defined in the appended claims.

What is claimed is:

1. In an adjustable vehicle seat, a rectangular seat frame for said seat, longitudinally adjustable seat tracks at each side of said seat frame each comprising upper and lower track sections telescopically arranged for relative sliding movement therebetween in a direction longitudinally of the vehicle, means mounting said seat frame upon said upper track sections, an elongated longitudinally extending supporting bracket at each side of said seat mounted upon the vehicle floor substantially beneath the seat track at the adjacent side of the seat, each of said supporting brackets having vertical flanges bent upwardly from the bracket adjacent the front and rear portions of said seat, a bell crank lever pivotally mounted upon each of said vertical flanges for pivotal movement about a horizontal transversely extending axis, means pivotally conncting the free end of the lower arm of each of said bell crank levers to the adjacent end of the adjacent lower track section, a link at each side of said seat pivotally connected at its opposite ends to the free ends of the upper arms of the front and rear bell crank levers at that side of the seat, a transversely extending member interconnecting the levers and links at opposite sides of the seat, and actuating means operatively connected to said transversely extending member to bodily move said member and simultaneously rotate all of said bell crank levers about their respective axes to bodily raise and lower said tracks and said seat frame to effect vertical adjustment thereof.

2. The structure defined by claim 1 which is further characterized in that the means pivotally connecting the free ends of the first mentioned arms of the bell crank levers to the lower track sections comprise track supporting arms one adjacent each of said bell crank levers, each of said track supporting arms having an elongated flange secured to the lower portion of one end of the adjacent lower track section and an integral laterally inwardly projecting boss having means thereon pivotally connected to the free end of the lower arm of the adjacent bell crang lever, and a coil spring at each side of said seat, the lower end of each said coil springs being seated upon the adjacent supporting bracket and the upper end thereof engaging one of said track support arms, said springs applying an upward force to said seat tracks and interconnected seat frame.

3. In an adjustable vehicle seat, a rectangular seat frame for said seat, longitudinally adjustable seat tracks for adjusting said seat frame longitudinally of the vehicle, said seat tracks being located at each side of said seat frame and each comprising upper and lower track sections telescopically arranged for relative sliding movement therebetween, means mounting said seat frame upon said upper track sections, a longitudinally extending supporting bracket mounted upon the vehicle floor adjacent each side of said seat, each of said supporting brackets having a vertical flange bent upwardly therefrom at each end, a bell crank lever pivotally mounted upon each of said vertical flanges for pivotal movement about a transverse horizontal axis, each of said bell crank levers having upper and lower arms with the lower arms of the front and rear mounted levers having laterally outwardly extending bosses formed thereon and provided with transversely extending bores therethrough, a track supporting arm adjacent each of said bell crank levers, each of said track supporting arms having an elongated flat portion secured to the adjacent lower track section and an integral laterally inwardly projecting boss abutting the laterally outwardly projecting boss at the end of the lower arm of the adjacent bell crank lever, each said track supporting arms having a cylindrical shank projecting laterally inwardly from its boss and journaled in the bore in the boss formed on the lower arm of the bell crank lever, the upper arm of each front bell crank having a laterally inwardly projecting boss formed at its free end, a transversely extending shaft interconnecting the front bell crank levers at the opposite sides of said seat and having its ends received within and secured to the bosses formed on the ends of the upper arms of the front bell crank levers, and a pair of longitudinally extending links each having its forward end pivotally connected to the upper arm of the front bell crank lever and its rearward end pivotally connected to the upper arm of the rear bell crank lever at the same side of the seat to provide simultaneous rotative movement of the front and rear bell crank levers at the same side of the seat, and actuating means operatively connected to the central portion of said transversely extending shaft to bodily move the latter forwardly and rearwardly to rotate the front bell crank levers and the innerconnected rear bell crank levers and to bodily raise and lower the seat tracks and the seat frame carried thereby.

4. In an adjustable vehicle seat, a rectangular seat frame for said seat, longitudinally adjustable seat tracks at each side of said seat frame each comprising upper and lower track sections telescopically arranged for relative sliding movement therebetween in a direction longitudinally of the vehicle, means mounting said seat frame upon said upper track sections, a pair of supporting brackets mounted upon the vehicle floor adjacent each side of said seat, a pair of levers at each side of said seat pivotally mounted upon said supporting brackets for pivotal movement about horizontal transversely extending axes, a pair of track supporting arms for each of said seat tracks, each of said track supporting arms being pivotally connected to the adjacent lever and rigidly connected to the adjacent end of the lower seat track, said upper and lower track sections being generally channel shaped with the channels facing each other and with the sections having side flanges projecting laterally outwardly from the channel portions thereof and telescopically engaging each other, an antifriction ball at each end of each seat track located between the upper and lower track sections, the diameter of each ball being greater than the width of the channel shaped portion of the upper and lower track sections so that the contact between the ball and the track sections occurs at the junctures between the channel shaped portions of the track sections and the laterally outwardly projecting flanges thereof, and a pair of longitudinally spaced studs connecting each track supporting arms to the lower track section and having extensions projecting through the lower track section into the path of an antifriction ball to confine the longitudinal movement of the latter between the said pair of studs.

References Cited in the file of this patent

UNITED STATES PATENTS

| | | |
|---|---|---|
| 1,664,129 | Pallenberg | Mar. 27, 1928 |
| 1,952,376 | Knabusch et al. | Mar. 27, 1936 |
| 2,260,032 | Kaiser et al. | Oct. 21, 1941 |
| 2,678,082 | Walker | May 11, 1954 |

FOREIGN PATENTS

| | | |
|---|---|---|
| 839,713 | France | Jan. 7, 1939 |